C. BUETEFISCH & H. G. COSTER.
FOLDABLE TRUCK.
APPLICATION FILED OCT. 25, 1916.
1,285,923. Patented Nov. 26, 1918.
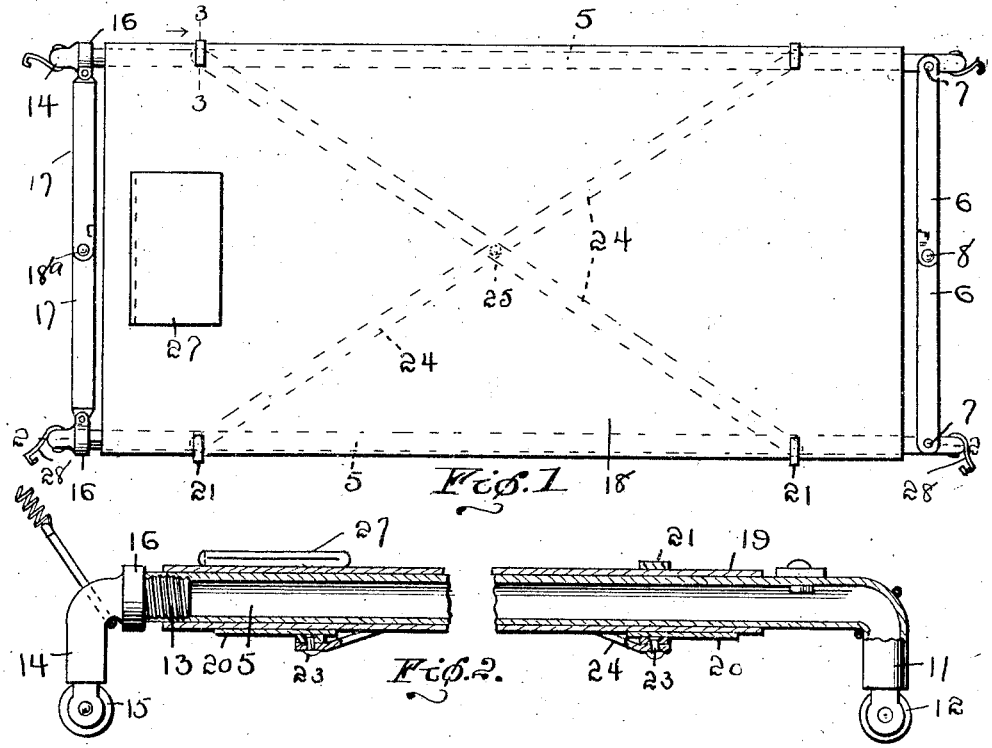
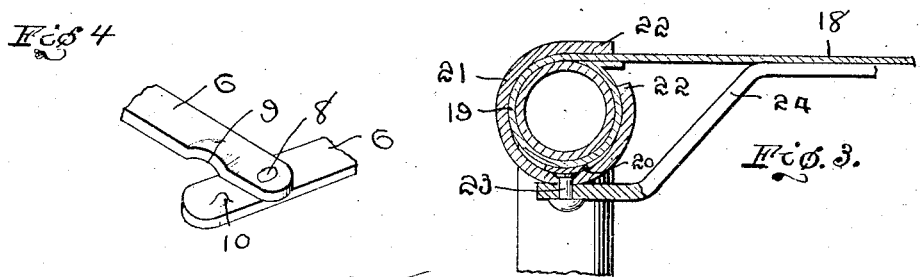
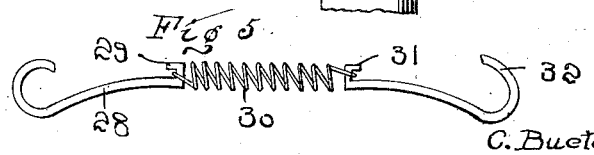
Inventor
C. Buetefisch
H. G. Coster.

UNITED STATES PATENT OFFICE.

CHARLES BUETEFISCH AND HELGE G. COSTER, OF ELLICOTT CITY, MARYLAND.

FOLDABLE TRUCK.

1,285,923.  Specification of Letters Patent.  Patented Nov. 26, 1918.

Application filed October 25, 1916. Serial No. 127,623.

*To all whom it may concern:*

Be it known that we, CHARLES BUETEFISCH and HELGE G. COSTER, citizens of the United States, residing at Ellicott City, in the county of Howard and State of Maryland, have invented certain new and useful Improvements in Foldable Trucks; and we do hereby declare the following to be a full, clear, and exact description of the invention, such as will enable others skilled in the art to which it appertains to make and use the same.

This invention has for its object to provide an improved truck of light and durable construction embodying novel features of construction, whereby it may be compactly folded when not in use.

Another object is the provision of a truck including a collapsible frame structure and a foldable top detachably secured thereto.

Another object is the provision of means for resiliently suspending the truck within a motor vehicle or other supporting structure, whereby it may be utilized as a bed.

Another object is the provision of a tubular flap attached to the top of the cover which may be filled with fabric or other yieldable material designed to adapt the tubular flap as a head rest or pillow.

With these and other objects in view, the invention consists in the novel construction, combination and arrangement of parts as will be hereinafter specifically described, claimed and illustrated in the accompanying drawing, in which:

Figure 1 represents a plan view of the truck in extended or operative position.

Fig. 2 represents a longitudinal sectional view on the line 2—2 of Fig. 1,

Fig. 3 represents a fragmentary transverse sectional view on the line 3—3 of Fig. 1, and Fig. 4 represents a fragmentary perspective view of the pivoted sections connecting the ends of the side members of the frame, Fig. 5 represents a plan view of the resilient supporting means for the truck.

Referring to the drawing in detail, wherein similar reference numerals designate corresponding parts throughout the several views, the numerals 5 indicate the side or longitudinal members of the frame, which are preferably of hollow tubular formation and are connected at one end by a pair of links or sections 6, which are pivotally secured to the side members at 7, and are pivotally secured together at 8. One of the sections or links 6 is provided with a depression 9 adapted to receive a lug 10 formed on the adjacent terminal of the other section, whereby the sections are limited in their outward swinging movement. The ends of the side members 5, adjacent the links 6, are directed downwardly, as indicated at 11, and are rotatably secured to rollers 12, whereby one end of the frame is supported.

The opposite ends of the side members 5 are formed with internal screw threads, in which are removably fitted the angularly directed and threaded shanks 13 carried by the supporting legs 14, in which are rotatably mounted rollers 15 supporting the opposite end of the frame structure. Rings 16 are rotatably mounted upon the shanks 13 and are pivotally connected with the adjacent terminals of a pair of links 17, which are pivotally connected together at $18^a$ and are identical in construction to the links 6 at the opposite end of the frame structure.

A top 18, preferably formed of canvas, or other flexible material, is provided with looped longitudinal edges 19 which receive the longitudinal members 5 of the frame and adjacent their opposite ends the looped portions of the top are secured to wear plates 20.

A pair of circular bands 21 are loosely fitted and slidable on each of the looped edges 19 of the cover or top 18 and receive between the spaced ends 22 thereof the horizontally disposed portion of the top or cover 18. The band 21 at each end of one longitudinal or side member 5 is pivotally connected at 23 with a reinforcing link or lever 24 and the opposite end of the lever is connected with the band 21 mounted upon the opposite end of the other side or longitudinal member 5, as clearly shown in Fig. 1. The links 24, at their point of intersection, are pivotally secured together by a pin or rivet 25.

An elongated flap 27 is secured along one longitudinal edge adjacent one end of the top 18, and is preferably constructed of canvas or other flexible material similar to that from which the top is made. The flap comprises two thicknesses of material secured together along their longitudinal edges, thereby providing a tubular structure for receiving fabric or other yieldable material, for the purpose which will hereinafter appear.

A plurality of hooks 28 are detachably connected with the supporting frame of the truck and are formed at their outer terminals with relatively small hooks 29 having connection with the adjacent terminals of coil springs 30. The opposite terminals of the springs 30 are connected with the relatively small hooks 31 carried by the outer hooks 32, which are adapted to embrace the sides of a motor vehicle or other support.

In use, the frame is extended, as shown in Fig. 1, and the truck may be conveniently transported upon rollers 12 and 15. When it is desired to utilize the truck as a bed the hooks 28 are attached to the supporting frame and the hooks 32 are slipped over the sides of a touring car or other support, thereby resiliently suspending the truck therefrom. When the truck is used as a bed the flap 27 is swung back over the pivoted links 17 and is preferably filled with fabric or other yieldable material to provide a comfortable head rest for the user. If preferred, the springs 30 may be dispensed with and the adjacent ends of the hooks 28 and 32 directly connected by the hooks 29 and 31. When desired, the frame may be folded or collapsed by moving the pairs of links 6 and 17 inwardly, the bands 21 sliding upon the wear plates 20 and permitting the crossed links or levers 24 to collapse. When it is desired to remove the top or cover 18 to repair or replace the same, the shanks 13 of the legs 14 are removed from the ends of the side members 5 and the looped end portions 19 of the top or cover 18 may be conveniently slipped off of the side members 5.

What we claim is:

1. A foldable truck including a pair of spaced side members, pairs of pivoted links connecting said side members at their opposite ends, a pair of crossed and pivoted links slidably engaged at their opposite ends with said side members, and a flexible cover or top secured at its longitudinal edges to said side members between the pairs of pivoted links and supported upon said crossed links.

2. A foldable truck comprising a pair of side members, a flexible top or cover secured to said side members and removable therefrom, split bands supported upon said side members and removable independently of said cover or top, and a pair of crossed and pivoted links connecting the bands at the opposite ends of the respective side members.

3. A foldable truck including a pair of side members, a pair of pivoted links connecting one end of said side members, rollers supporting the last-mentioned end of said side members, a pair of legs for the opposite end of said side members, angularly directed shanks carried by the last-mentioned legs removably fitted in the adjacent ends of said side members, and a pair of pivoted links connecting said shanks.

4. A foldable truck including a pair of side members, a pair of pivoted links connecting one end of said side members, rollers supporting the last-mentioned end of said side members, legs for supporting the opposite ends of said side members, rollers carried by said legs, angularly directed shanks carried by said legs threaded in the ends of said side members, a pair of pivoted links, rings carried by the terminals of the links rotatably receiving said shanks, and a flexible top or cover removably secured upon said side members between the pairs of links.

5. A foldable truck including a pair of side members, pivoted links connecting one end of said side members permitting the latter to be moved together, rings detachably secured to the opposite ends of the side members, pivoted links connecting said rings, and a flexible top or cover having tubular edges receiving said side members and confined between the pairs of links.

In testimony whereof we affix our signatures in presence of two witnesses.

CHARLES BUETEFISCH.
HELGE G. COSTER.

Witnesses:
ROBERT GEO. YATES,
GEO. W. RADCLIFFE.